United States Patent
Yang

(10) Patent No.: US 9,261,993 B2
(45) Date of Patent: Feb. 16, 2016

(54) TOUCH LIQUID CRYSTAL GRATING, MANUFACTURING METHOD THEREOF AND TOUCH 3D DISPLAY DEVICE

(71) Applicant: BEIJING BOE OPTOELECTRONICS TECHNOLOGY CO., LTD., Beijing (CN)

(72) Inventor: Shengji Yang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 14/108,634

(22) Filed: Dec. 17, 2013

(65) Prior Publication Data

US 2014/0211104 A1     Jul. 31, 2014

(30) Foreign Application Priority Data

Jan. 29, 2013    (CN) .......................... 2013 1 0033910

(51) Int. Cl.
    *G02B 27/26*     (2006.01)
    *G06F 3/041*     (2006.01)
    *G02B 27/22*     (2006.01)

(52) U.S. Cl.
    CPC ................ *G06F 3/041* (2013.01); *G02B 27/22* (2013.01); *Y10T 29/49117* (2015.01)

(58) Field of Classification Search
    CPC .... G06F 3/041; G06F 3/044; Y10T 29/49117
    USPC .......................................................... 349/12
    See application file for complete search history.

(56) References Cited

U.S. PATENT DOCUMENTS

2006/0197725 A1*    9/2006    Nam et al. ...................... 345/87
2008/0062148 A1*    3/2008    Hotelling et al. ............. 345/174

(Continued)

FOREIGN PATENT DOCUMENTS

| CN | 102830555 | * | 12/2012 | ............. G02B 27/26 |
| CN | 102830555 A | | 12/2012 | |
| CN | 203054407 U | | 7/2013 | |

OTHER PUBLICATIONS

The State Intellectual Property Office of the People's Republic of China ("SIPO") (Chinese Language) First Office Action issued Jan. 4, 2015 by SIPO in Chinese Patent Application 201310033910.5; ten (10) pages.

English Translation of the State Intellectual Property Office of the People's Republic of China ("SIPO") Office Action issued Jan. 4, 2015 by SIPO in Chinese Patent Application 201310033910.5; nine (9) pages.

(Continued)

*Primary Examiner* — Sang V Nguyen

(57) ABSTRACT

Embodiments of the present invention provide a touch liquid crystal grating, a manufacturing method thereof and a touch 3D display device, the touch liquid crystal grating comprising: a first substrate and a second substrate; a liquid crystal layer; first electrodes, disposed on a side of the first substrate facing the liquid crystal layer; an insulating layer, covering the first electrodes; second electrodes, disposed on a side of the insulating layer facing the liquid crystal layer, a spacing region being between adjacent two second electrodes; second touch electrodes, disposed in the same layer with the second electrodes, each being located in one spacing region; first touch electrodes, wherein when being powered on, the first and second touch electrodes function to realize a touch function; liquid crystal molecules under the second electrodes rotate, and liquid crystal molecules under the second touch electrodes do not rotate, forming the liquid crystal grating.

14 Claims, 7 Drawing Sheets

(56) References Cited

U.S. PATENT DOCUMENTS

| | | | |
|---|---|---|---|
| 2008/0218459 A1* | 9/2008 | Kim | G02F 1/1323 345/87 |
| 2009/0190048 A1* | 7/2009 | Hong et al. | 349/15 |
| 2010/0328239 A1* | 12/2010 | Harada et al. | 345/173 |
| 2011/0096251 A1* | 4/2011 | Son et al. | 349/15 |
| 2011/0109622 A1* | 5/2011 | Son et al. | 345/419 |
| 2012/0327005 A1* | 12/2012 | Hamada et al. | 345/173 |
| 2012/0327027 A1* | 12/2012 | Chang | G06F 3/0416 345/174 |
| 2013/0241869 A1* | 9/2013 | Kida et al. | 345/174 |
| 2014/0063385 A1 | 3/2014 | Yang | |

OTHER PUBLICATIONS

English abstract of CN102830555(A) listed above; 1 page.
English abstract of CN203054407(U) listed above; 1 page.
Second Office Action issued by the State Intellectual Property Office of the People's Republic of China (Chinese Language), in Chinese Patent Application 201310033910.5, dated May 20, 2015; nine (9) pages.
English Translation of Second Office Action issued by the State Intellectual Property Office of the People's Republic of China, in Chinese Patent Application 201310033910.5, dated May 20, 2015; ten (10) pages.

* cited by examiner

TOUCH LIQUID CRYSTAL GRATING, MANUFACTURING METHOD THEREOF AND TOUCH 3D DISPLAY DEVICE

CROSS REFERENCE TO RELATED APPLICATIONS

This application claims priority from Chinese National Application No. 201310033910.5 filed on Jan. 29, 2013, the contents of which are incorporated herein by reference.

TECHNICAL FIELD

Embodiments of the present invention relate to a touch liquid crystal grating, a manufacturing method thereof and a touch 3D display device.

BACKGROUND

The principle for three-dimensional stereoscopic display technology is that left and right eyes receive a pair of images with parallax at the same time so as to form 3D effect by a processing using the human's brain.

The three-dimensional stereoscopic display is mainly classified into a naked eye type and a glasses type. The naked eye type stereoscopic display technology is mainly classified into a parallax barrier type and a lenticular lens type. For a liquid crystal parallax barrier, its implementation method is to produce a series of alternate light-shielding and light-transmitting stripes with a liquid crystal layer and a polarizer to form a liquid crystal grating for splitting light. With the liquid crystal parallax barrier, in a stereoscopic display mode, when a left eye image to be seen by the left eye is displayed on a display panel, the light-shielding stripes may make the left eye image not be seen by the right eye. Similarly, when a right eye image to be seen by the right eye is displayed on the display panel, the light-shielding stripes will make the right eye image not be seen by the left eye. By separating the left eye image and the right eye image, it is possible to make the viewer have a stereoscopic vision. The liquid crystal parallax barrier may be compatible with a conventional manufacturing process of a liquid crystal display panel, therefore it has advantages in terms of mass production and cost.

At present, a product with a combination of a 3D display function and a touch function attracts more and more attentions. However, at present, a structure of a touch screen plus a liquid crystal grating as shown in FIG. 1 is usually used, the structure of the touch screen plus the liquid crystal grating includes a first electrode layer 11, a second electrode layer 12 and a touch electrode layer 13, wherein the touch electrode layer includes a second touch electrode layer and a first touch electrode layer, that is, the structure has at least four layers of electrodes. Moreover, more electrode layers will decrease light transmittance of the entire liquid crystal grating and influence the display effect. Since both substrates have electrodes disposed thereon, a conductive adhesive is needed to transmit a voltage signal and it is also required to dispose alignment marks on the two substrates respectively for precise cell-assembling, which increases the complexity degree of manufacturing and the manufacturing cost. In addition, the structure of the touch screen plus the liquid crystal grating has a large thickness, which will certainly influence the transmittance and display effect of the entire 3D display device.

SUMMARY

Embodiments of the present invention provide a touch liquid crystal grating, a manufacturing method thereof and a touch 3D display device which can reduce a thickness of the touch liquid crystal grating, improve light transmittance of the touch 3D display device and meanwhile decrease the number of manufacturing process and reduce the production cost.

In an aspect, an embodiment of the present invention provides a touch liquid crystal grating, comprising: a first substrate; a second substrate, cell-assembled with the first substrate; a liquid crystal layer, filled between the first substrate and the second substrate; a plurality of first electrodes, disposed on a side of the first substrate facing the liquid crystal layer parallel to and spaced apart from each other; an insulating layer, covering the plurality of first electrodes; a plurality of second electrodes, disposed on a side of the insulating layer facing the liquid crystal layer spaced apart from each other and extending parallel to the plurality of first electrodes, a spacing region being between adjacent two second electrodes; a plurality of second touch electrodes, parallel to each other and disposed in the same layer with the plurality of second electrodes, each of the second touch electrodes being located in one spacing region; a plurality of first touch electrodes, disposed parallel to each other on a side of the first substrate opposite to the liquid crystal layer, wherein when the touch liquid crystal grating is powered on, the first touch electrodes and the second touch electrodes function to realize a touch function; liquid crystal molecules in a region under the plurality of second electrodes rotate, and liquid crystal molecules in a region under the plurality of second touch electrodes do not rotate, forming the liquid crystal grating.

In another aspect, an embodiment of the present invention provides a touch 3D display device, comprises: a display panel; and a touch liquid crystal grating as mentioned above, disposed on a light exiting side of the display panel.

In yet another aspect, an embodiment of the present invention further provides a manufacturing method for the touch liquid crystal grating, comprising: preparing a first substrate and a second substrate; forming a plurality of first electrodes parallel to each other on a side of the first substrate; forming an insulating layer on the first electrodes and forming through holes in the insulating layer; manufacturing a plurality of second electrodes parallel to each other and a plurality of second touch electrodes parallel to each other in the same layer on the insulating layer; manufacturing a plurality of first touch electrodes parallel to each other and perpendicular to the plurality of second touch electrodes in different planes on another side of the first substrate; and cell-assembling the first substrate and the second substrate and injecting a liquid crystal layer between the first substrate and the second substrate, wherein each of the second touch electrodes is located in a spacing region between two adjacent second electrodes.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
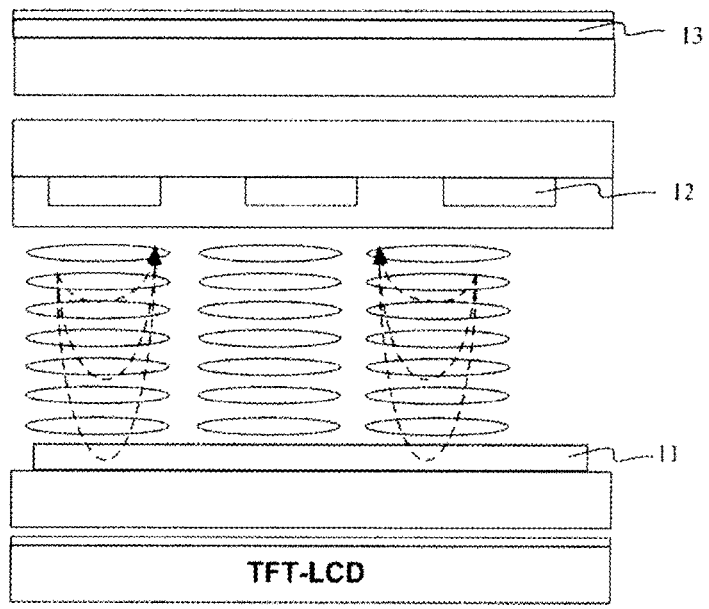
FIG. 1 is a sectional view of a structure of a touch screen plus a liquid crystal grating in the prior art.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention Embodiments of the present invention provide a touch liquid crystal grating, a manufacturing method thereof and a touch 3D display device which can reduce a thickness of the touch liquid crystal grating, improve light transmittance of the touch 3D display device and meanwhile decrease the number of manufacturing process and reduce the production cost.

An embodiment of the present invention provides a touch liquid crystal grating, comprising: a first substrate; a second substrate, cell-assembled with the first substrate; a liquid crystal layer, filled between the first substrate and the second substrate; a plurality of first electrodes, disposed on a side of the first substrate facing the liquid crystal layer parallel to and spaced apart from each other; an insulating layer, covering the plurality of first electrodes; a plurality of second electrodes, disposed on a side of the insulating layer facing the liquid crystal layer spaced apart from each other and extending parallel to the plurality of first electrodes, a spacing region being between adjacent two second electrodes; a plurality of second touch electrodes, parallel to each other and disposed in the same layer with the plurality of second electrodes, each of the second touch electrodes being located in one spacing region; a plurality of first touch electrodes, disposed parallel to each other on a side of the first substrate opposite to the liquid crystal layer, wherein when the touch liquid crystal grating is powered on, the first touch electrodes and the second touch electrodes function to realize a touch function; liquid crystal molecules in a region under the plurality of second electrodes rotate, and liquid crystal molecules in a region under the plurality of second touch electrodes do not rotate, forming the liquid crystal grating.

Exemplarily, each of the first touch electrodes is a strip-shaped electrode with a width of 5~6 mm and perpendicular to the second touch electrodes in a different plane.

Exemplarily, each of the second electrodes has a width of a half of a unit pixel width and each second electrode includes at least two second sub-electrodes. The unit pixel width is equal to a sum of the width of each second electrode and the width of the spacing region between two adjacent second electrodes. The second sub-electrode may be of stripe shape, wave shape, sawtooth shape or the like.

Exemplarily, each of the second touch electrodes is located in the spacing region between two adjacent second electrodes and perpendicular to the first touch electrodes in a different plane.

Exemplarily, each of the second touch electrodes comprises at least two second touch sub-electrodes parallel to each other and either ends of all second touch sub-electrodes of each of the second touch electrodes are connected by a metal wire.

Exemplarily, each of the first electrodes is a strip-shaped electrode with a width same as the width of the corresponding second electrode directly therebelow.

Furthermore, the touch liquid crystal grating further includes a liquid crystal layer filled between the first substrate and the second substrate. When being powered on, liquid crystal molecules in a region below each of the second electrodes rotate, while liquid crystal molecules in a region below each of the second touch electrodes do not rotate, hence realizing a 3D function.

The touch liquid crystal grating according to embodiments of the present invention will be described in detail with reference to drawings.

Figure 2:
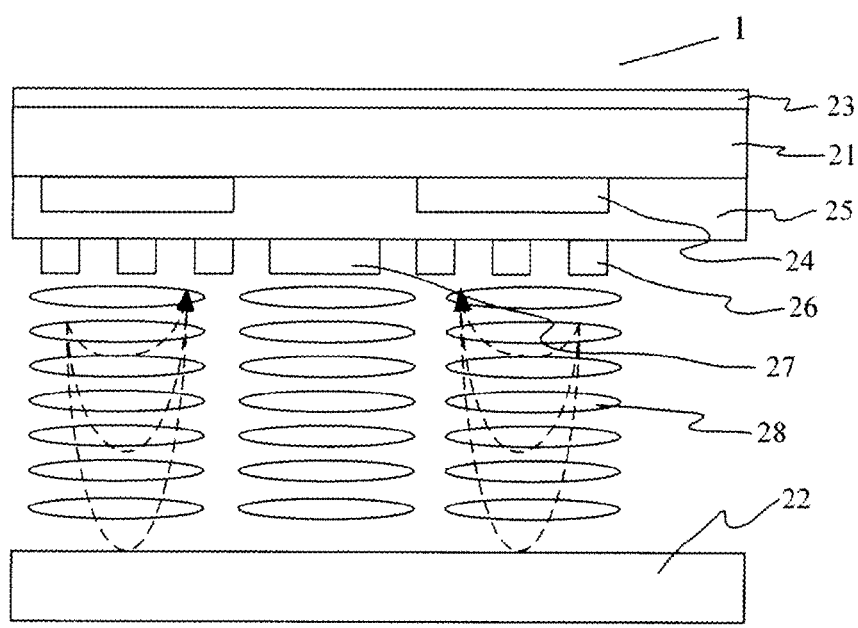
FIG. 2 is a sectional structure view of a touch liquid crystal grating according to an embodiment of the present invention.
Figure 3:
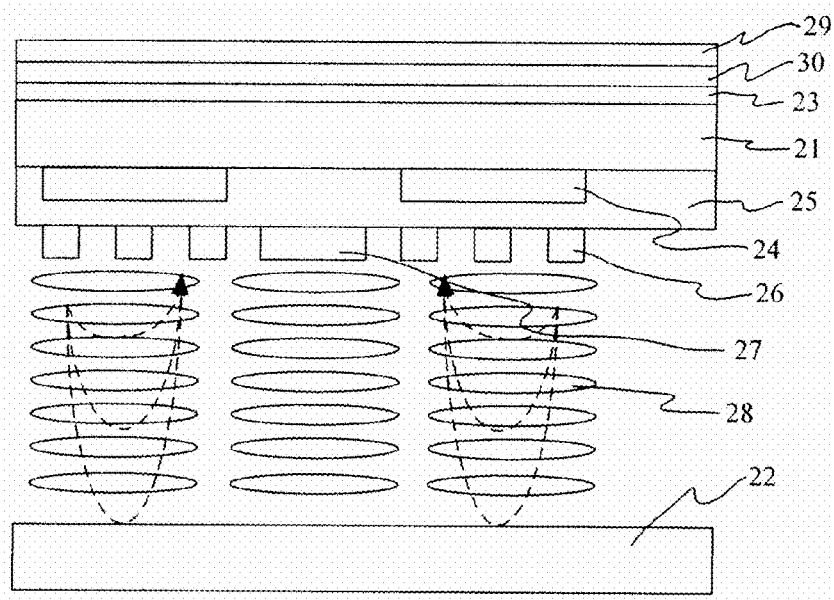
FIG. 3 is a sectional structure view of another touch liquid crystal grating according to an embodiment of the present invention.

FIG. 2 is a sectional structure view of a touch liquid crystal grating according to an embodiment of the present invention. FIG. 3 is a sectional structure view of another touch liquid crystal grating according to an embodiment of the present invention. As can be seen in FIG. 2, the touch liquid crystal grating 1 includes a first substrate 21, a second substrate 22, a plurality of first touch electrodes 23, a plurality of first electrodes 24, an insulating layer 25, a plurality of second electrodes 26, a plurality of second touch electrodes 27 and a liquid crystal layer 28.

With reference to FIGS. 2 and 3, it can be seen that the plurality of first touch electrodes 23 are disposed parallel to each other on a side of the first substrate that is opposite to the liquid crystal layer. Exemplarily, each of the first touch electrodes 23 is a strip-shaped electrode with a width of 5~6 mm and perpendicular to the plurality of second touch electrodes 27 in a different plane.

The first electrodes 24 are strip-shaped electrodes and are disposed parallel to and spaced from each other on a side of the first substrate facing the liquid crystal layer, and are parallel to the second electrodes in a different plane. Their width is the same as that of the second electrodes and may be a half of a unit pixel width. When the touch liquid crystal grating operates, the first electrodes are grounded to form a mutual capacitance with the second electrodes. At the same time, the first electrodes 24 serve as a shielding layer for shielding electrical signals emitted from the underlying second electrodes and ensure that the underlying second electrodes will not influence the first touch electrodes while being connected with the liquid crystal driving signal.

Herein, it is noted that a width of each second electrode and a width of a spacing region between two second electrodes may be determined according to practical situation and may be equal or not be equal, as long as the touch liquid crystal grating can form alternate light-shielding and light-transmitting stripes to realize the 3D display while in a 3D display mode. Furthermore, the relationship between the width of each second electrode and the unit pixel width may also be determined according to actual requirement. For example, the width of each second electrode may be half of the unit pixel width, as long as it can realize the 3D display.

The insulating layer 25 is located between the first electrodes 24 and the second electrodes 26 and the second touch electrodes 27 for insulating the first electrodes 24 and the second electrodes 26.

The second electrode 26 and the second touch electrode 27 are both located on the insulating layer and are spaced apart from each other; each of the second electrodes 26 is located directly below each first electrode and may include at least two second sub-electrodes. Exemplarily, as shown in FIGS. 2 and 4, each second electrode comprises three second sub-electrodes, and there is a slit between every two second sub-electrodes, and all the slits constituted by the second sub-electrodes have the same width; the second electrode 26 is configured to connect a liquid crystal driving signal and cooperate with the first electrode 24 to form an electric field under the second electrode 26, so as to drive liquid crystal molecules under it to rotate, allowing light emitted by a liquid crystal display to pass through to form a bright field or preventing the light emitted by the liquid crystal display from passing through to form a dark field.

Figure 4:
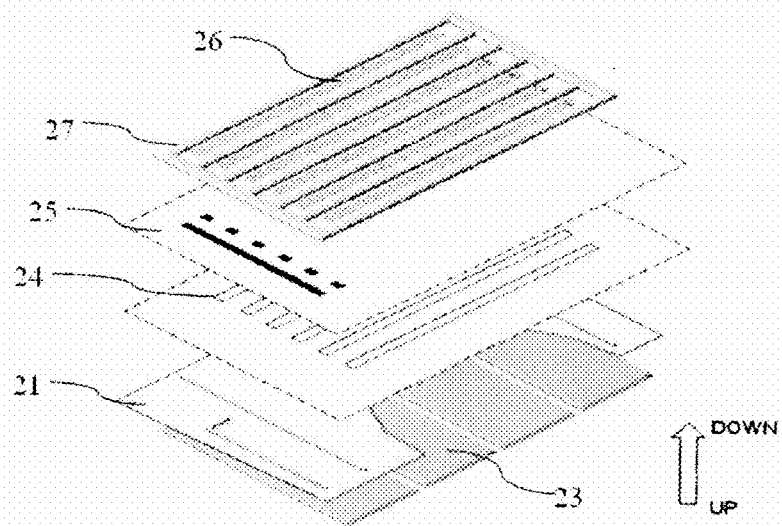
FIG. 4 is a perspective view of a touch liquid crystal grating according to an embodiment of the present invention.
Figure 5:
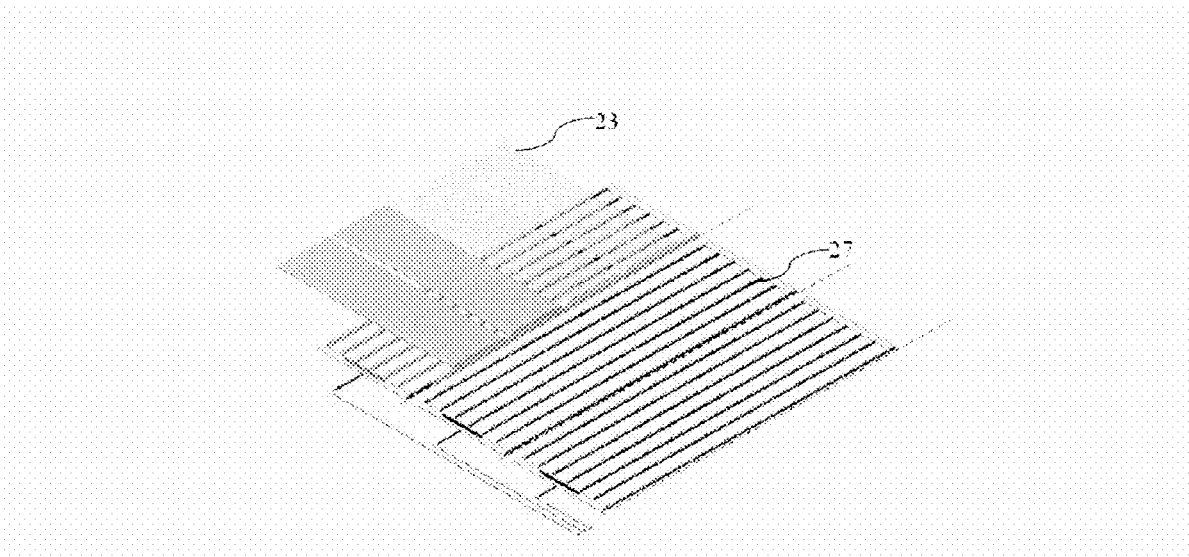
FIG. 5 is a schematic view of shapes and arrangements of first touch electrodes and second touch electrodes according to an embodiment of the present invention.
Figure 6:
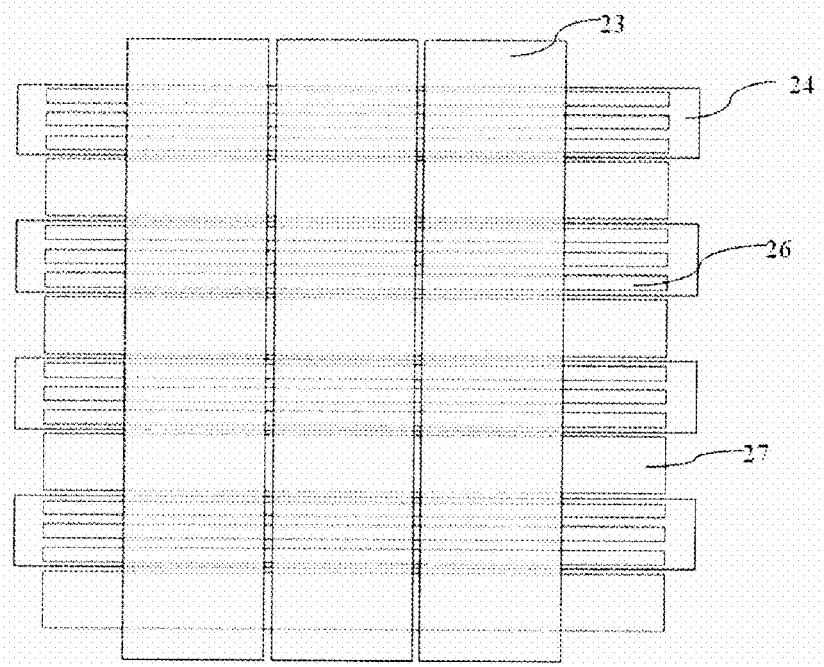
FIG. 6 is a schematic view of distribution of all electrodes on a first substrate according to an embodiment of the present invention.

Exemplarily, as can be seen in FIG. 4, each of the second touch electrodes 27 is located in the spacing region between two adjacent second electrodes and perpendicular to the first touch electrodes 23 in a different plane and form a mutual capacitance at an overlapping position with each first touch electrode 23. Its shape and position distribution relationship is shown in FIG. 5.

Exemplarily, the second touch electrode 27 comprises at least two second touch sub-electrodes parallel to each other. For example, for the second touch electrode shown in FIG. 5, each second touch electrode 27 includes seven second touch sub-electrodes and either ends of all second touch sub-electrodes of each second touch electrode are connected by a metal wire, guaranteeing the overall display effect of the liquid crystal panel.

Exemplarily, the second electrode 26 and the second touch electrode 27 are disposed in the same layer, that is, the second electrode 26 and the second touch electrode 27 are manufactured in one patterning process, which can reduce the number of electrode layer in the touch liquid crystal grating, effectively reduce a thickness of the touch liquid crystal grating and enhance the light transmittance.

Exemplarily, the touch liquid crystal grating according to the embodiments of the present invention may further include a planarization layer 30, covering the plurality of first touch electrodes; and a third polarizer 29, disposed on a side of the planarization layer that is opposite to the liquid crystal layer. This touch liquid crystal grating is shown in FIG. 3.

Exemplarily, the plurality of first touch electrodes 23, the plurality of first electrodes 24, the plurality of second electrodes 26 and the plurality of second touch electrodes 27 may be made of transparent, conductive materials such as ITO (Indium Tin Oxides).

Further, routing relationship of the first touch electrodes 23, the first electrodes 24, the second electrodes 26 and the second touch electrodes 27 in the first substrate is shown in FIG. 5. As can be seen in FIG. 5, the first touch electrodes 23 are perpendicular to the other three electrodes, and the first electrode 24, the second electrode 26 and the second touch electrode 27 are parallel to each other.

At the same time, the touch liquid crystal grating further includes a liquid crystal layer 28 between the first substrate and the second substrate. When being powered on, liquid crystal molecules in regions under the second electrodes rotate and liquid crystal molecules in regions under the second touch electrodes do not rotate so as to form a 3D liquid crystal grating.

Furthermore, the touch liquid crystal grating may further include a third polarizer 29 disposed above the first touch electrodes.

If the touch liquid crystal grating according to embodiments of the present invention is applied to a liquid crystal display panel, the third polarizer 29 and the second polarizer 210 above a color filter substrate in the liquid crystal display panel have transmission axes parallel to each other.

Exemplarily, when the transmission axes of the third polarizer 29 and the second polarizer 210 are parallel to each other, liquid crystal molecules are oriented horizontally while not being powered on, the liquid crystal layer 28 has no delay function on polarized light passing through the second polarizer 210. The polarized light passing through the liquid crystal layer 28 has a polarization direction identical with the transmission axis of the polarizer 29, and therefore, bright fields are formed in both a region A under the second electrode and a region B under the second touch electrode, hence realizing the 2D display. While being powered on, liquid crystal molecules in the liquid crystal layer 28 in the region A under the second electrode rotate horizontally, the liquid crystal layer 28 has a delay function on polarized light passing through the first polarizer 210. The polarized light passing through the liquid crystal layer 28 has a polarization direction different from the transmission axis of the polarizer 29, and therefore, a dark field is formed in the region A under the second electrode and in the region B under the second touch electrode, a bright field is retained. The bright field and the dark field form together a touch 3D grating, realizing the 3D display.

Figure 7:
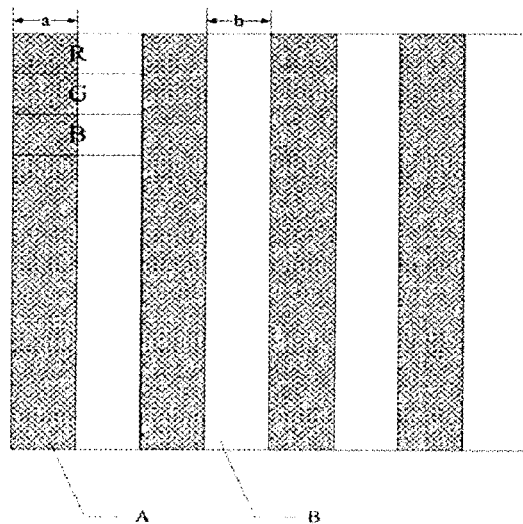
FIG. 7 is a distribution view of regions corresponding to second electrodes and regions corresponding to second touch electrodes according to an embodiment of the present invention.

Exemplarily, as shown in FIG. 7, a width a of the corresponding region A under the second electrode and a width b of the corresponding region B under the second touch electrode may be the same. The width a of the corresponding region A under the second electrode and the width b of the corresponding region B under the second touch electrode both are a half of a unit pixel constituted by RGB sub-pixels. Of course, the width a and the width b may also not be equal and the width a may not be equal to a half of the unit pixel width. The embodiments of the present invention do not limit this as long as the 3D display can be realized.

Thus, with the above-mentioned touch liquid crystal grating, when an image that should be seen by the left eye is displayed on the liquid crystal panel, the light-shielding stripes make the left eye image not be seen by the right eye; similarly, when an image that should be seen by the right eye is displayed on the liquid crystal panel, the light-shielding stripes make the right eye image not be seen by the left eye. The three-dimensional display effect is realized by separating the left eye image and the right eye image.

Figure 8:
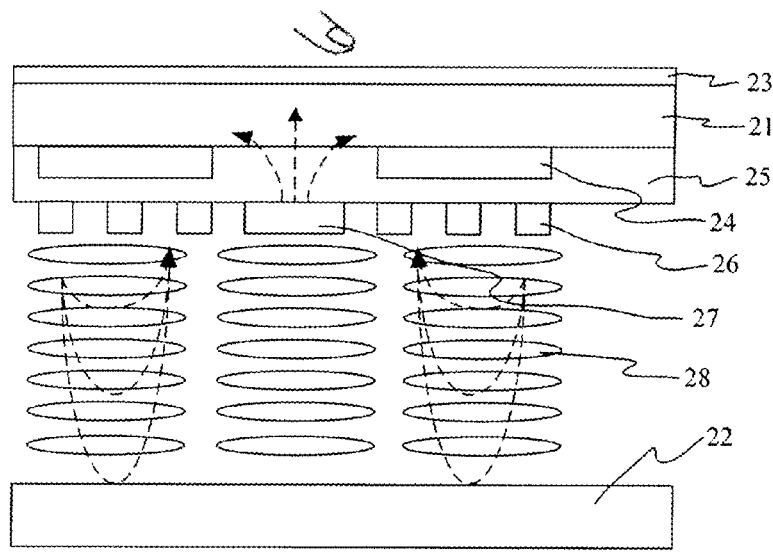
FIG. 8 is a schematic principle view of display and touch of a touch liquid crystal grating according to an embodiment of the present invention.

As can be known from above, with the touch liquid crystal grating provided by the embodiments of the present invention, a double layer touch electrode is used while realizing a touch function, that is, the first touch electrode 23 and the second touch electrode 27 are disposed in two layers with the first substrate and the insulating layer disposed therebetween. As shown in FIG. 8, the first touch electrode 23 and the second touch electrode 27 are perpendicular to each other in different planes and form an inductive capacitor at an overlapping position of the two electrodes. The operating and displaying principle is as follows.

When the second touch electrodes 27 are inputted a touch driving signal, an external circuit detects a voltage signal coupled out by the first touch electrodes 23 through the inductive capacitor. At the same time, when the human body touches the touch liquid crystal grating, a capacitance of the human body will be superposed with the inductive capacitor, making a capacitance value of the inductive capacitor change. This makes the voltage signal generated by the first touch electrode 23 through the inductive capacitor to change, and it is possible to determine a touch position according to a change of the voltage signal so as to realize a touch function.

An embodiment of the present invention further provides a manufacturing method for the touch liquid crystal grating, including:

preparing a first substrate and a second substrate;

forming a plurality of first electrodes parallel to each other on a side of the first substrate;

forming an insulating layer on the first electrodes and forming through holes in the insulating layer;

manufacturing a plurality of second electrodes parallel to each other and a plurality of second touch electrodes parallel to each other in a same layer on the insulating layer;

manufacturing a plurality of first touch electrodes parallel to each other and perpendicular to the plurality of first touch electrodes in a different plane on another side of the first substrate;

cell-assembling the first substrate and the second substrate and injecting a liquid crystal layer between the first substrate and the second substrate, wherein each of the second touch electrodes is located in a spacing region between two adjacent second electrodes.

Furthermore, the forming a plurality of first electrodes parallel to each other on a side of the first substrate comprises: manufacturing a first metal wire, a second metal wire and a third metal wire on a side of the first substrate, and then forming a plurality of first electrodes on the first metal wire to make one end of each of the plurality of first electrodes directly connected with the first metal wire, the plurality of first electrodes, the second metal wire and the third metal wire being insulated with each other.

Exemplarily, the forming through holes in the insulating layer comprises: forming a plurality of first through holes and a plurality of second through holes by a patterning process at locations corresponding to the second metal wire, the third metal wire in the insulating layer to allow the plurality of second electrodes connected with the second metal wire through the plurality of first through holes, and the plurality of second touch electrodes connected with the third metal wire through the plurality of second through holes.

Exemplarily, the forming a plurality of first touch electrodes parallel to each other on another side of the first substrate includes: manufacturing a fourth metal wire on another side of the first substrate and forming the plurality of first touch electrodes on the fourth metal wire to allow each of the plurality of first touch electrodes connected directly with the fourth metal wire.

Figure 9:
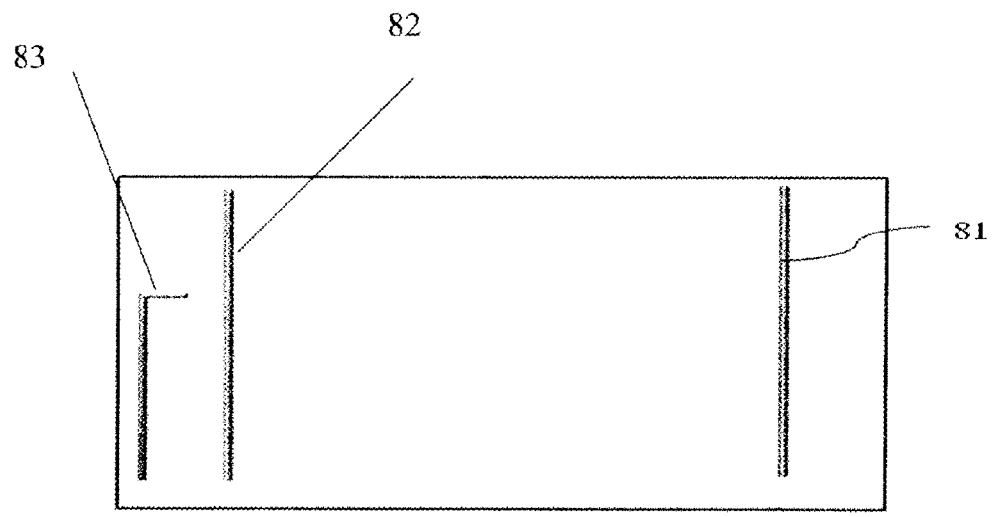
FIGS. 9-13 are schematic views of various steps of manufacturing a touch liquid crystal grating according to an embodiment of the present invention.
Figure 10:
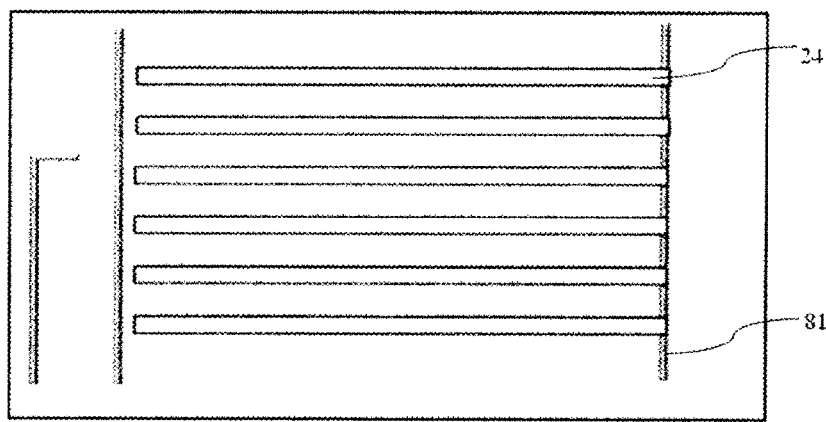
Figure 11:
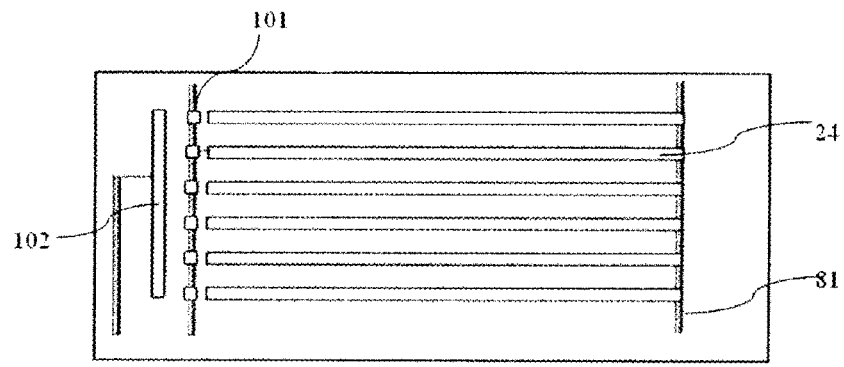
Figure 12:
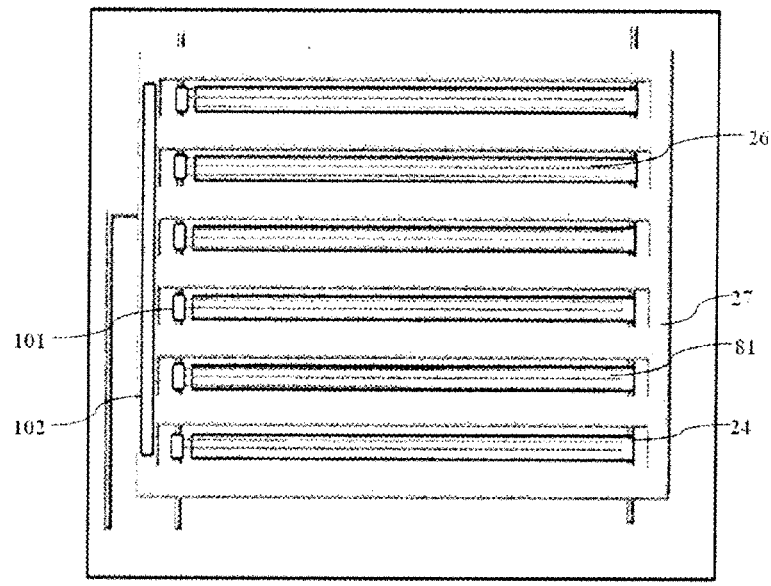
Figure 13:
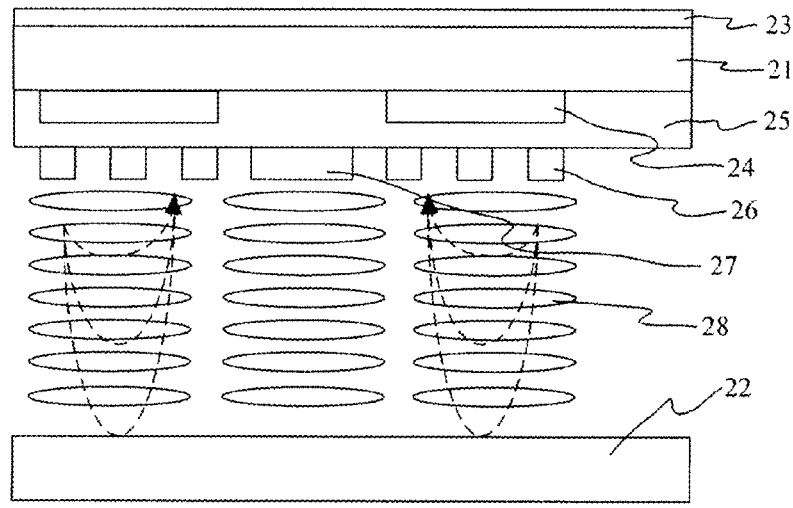

The manufacturing method for the touch liquid crystal grating according to the embodiment of the present invention will be described below with reference to accompany drawings, which may include the following steps:

Step 1, forming a metal layer on a side of the first substrate 21 and forming a first metal wire 81, a second metal wire 82 and a third metal wire 83 by a exposure process and other patterning processes using a mask, as shown in FIG. 9;

Step 2, forming a first electrode layer on a side of the first substrate 21 on which the first metal wire 81 is formed and forming a plurality of first electrodes 24 by a patterning process, right ends of all first electrodes 24 being directly connected with the first metal wire 81, as shown in FIG. 10;

Step 3, manufacturing an insulating layer 25 with transparent insulating material such as silicon dioxide on the first electrode layer for insulating the first electrodes 24 and the second electrodes; etching the insulating layer 25 to form a plurality of through holes as shown in FIG. 11, the through holes including a plurality of first through holes 101 for connecting the second electrodes and a plurality of second through holes 102 for connecting the touch electrodes;

Step 4, forming a plurality of second electrodes 26 and a plurality of second touch electrodes 27 at the same time by one patterning process on the insulating layer 25, wherein the second electrodes 26 are connected with the second metal wire 82 through the plurality of first through holes 101, the second touch electrodes 27 are connected with the third metal wire 83 through the plurality of second through holes 102, as shown in FIG. 12;

Step 5, manufacturing a fourth metal wire on another side of the first substrate 21 and then manufacturing first touch electrodes 23 to make the first touch electrodes directly connected with the fourth metal wire;

Step 6, cell-assembling the first substrate and the second substrate and injecting a liquid crystal layer between the first and second substrates to form the touch liquid crystal grating provided in the embodiments of the present invention, as shown in FIG. 13.

In addition, the manufacturing method for the touch liquid crystal grating according to the embodiments of the present invention may further include: before the step 6, forming a planarization layer 30 covering the first touch electrodes 23 on the first substrate and then forming a third polarizer 29 on the planarization layer 30 to obtain a touch liquid crystal grating as shown in FIG. 3.

An embodiment of the present invention provides a touch 3D display device, including: a display panel; and a touch liquid crystal grating as mentioned above, disposed on a light exiting side of the display panel.

Figure 14:
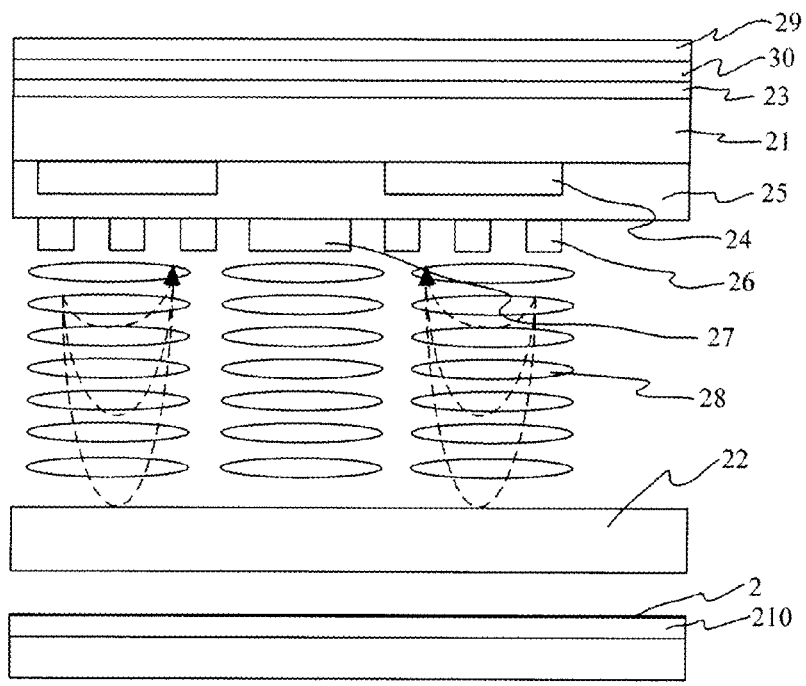
FIG. 14 is a sectional view of a 3D touch display device according to an embodiment of the present invention.

Exemplarily, the display panel may be a liquid crystal display panel. FIG. 14 shows a sectional view of a touch 3D display device obtained by incorporating a liquid crystal display panel and a touch liquid crystal grating. As shown in FIG. 14, in order to achieve a 3D grating, it is necessary to utilize a touch liquid crystal grating provided with a third polarizer 29. While since the liquid crystal display panel 2 includes a second polarizer 210 disposed above a color filter substrate, there is no need to add a polarizer between them. It is noted here that transmission axes of the second polarizer and the third polarizer are parallel to each other.

Exemplarily, the display panel may also be other display panels, such as a plasma display panel (PDP) or a cathode-ray tube display panel (CRT). It is noted that if there is no polarizer over the used display panel, it is necessary to dispose a polarizer between the touch liquid crystal grating and the display panel, and the transmission axis of the polarizer is parallel to that of the third polarizer 29.

In summary, the embodiments of the present invention provide a touch liquid crystal grating, a manufacturing method thereof and a touch 3D display device. The touch liquid crystal grating includes a first substrate, a second substrate, a polarizer, a liquid crystal layer, a plurality of first touch electrodes, a plurality of first electrodes, an insulating layer, a plurality of second electrodes and a plurality of second touch electrodes; wherein the plurality of first touch electrodes are disposed on a side of the first substrate opposite to the liquid crystal layer parallel to each other; the first electrodes are disposed on a side of the first substrate facing the liquid crystal layer parallel to and spaced apart from each other; the insulating layer covers the plurality of strip-shaped first electrodes to insulate the first electrodes and the second electrodes; the second electrodes and the second touch electrodes are disposed to spaced apart from each other on a side of the insulating layer facing the liquid crystal layer, and the first touch electrodes and the second touch electrodes insulated by the first substrate and the insulating layer realizes a multipoint touch function, dramatically enhancing the touch sensitivity and the SNR; when the second electrodes are connected with a liquid crystal driving signal, liquid crystal molecules in regions thereunder rotate to form bright fields, which form a touch liquid crystal grating together with dark fields under the second touch electrodes, and since grating electrodes are only formed on the first substrate and the second electrodes and the second touch electrodes in the grating are disposed in the same layer, the number of electrode layer is reduced, a thickness of the touch liquid crystal grating is reduced, and the light transmittance of the entire grating is enhanced; at the same time, since all electrodes are located on the first substrate, it is not necessary to use a conductive adhesive for transferring electrical signals, and alignment marks on the two substrate is not needed, which simplifies the fabrication process and decreases the production cost.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims

The invention claimed is:

1. A touch liquid crystal grating, comprising:
   a first substrate;
   a second substrate, cell-assembled with the first substrate;
   a liquid crystal layer, filled between the first substrate and the second substrate;
   a plurality of first electrodes, disposed on a side of the first substrate facing the liquid crystal layer parallel to and spaced apart from each other;
   an insulating layer, covering the plurality of first electrodes;
   a plurality of second electrodes, disposed on a side of the insulating layer facing the liquid crystal layer spaced apart from each other and extending parallel to the plurality of first electrodes, each of the plurality of second electrodes directly corresponding to each of the plurality of first electrodes and comprising at least two second sub-electrodes, a spacing region being between adjacent two second electrodes; wherein the plurality of first electrodes are disposed on a different layer from the plurality of second electrodes separated by the insulating layer such that the first electrodes serve as a shielding layer for shielding electrical signals emitted from the underlying second electrodes;
   a plurality of second touch electrodes, parallel to each other and disposed in the same layer with the plurality of second electrodes, each of the second touch electrodes being located in one spacing region;
   a plurality of first touch electrodes, disposed parallel to each other on a side of the first substrate opposite to the liquid crystal layer,
   wherein when the touch liquid crystal grating is powered on, the first touch electrodes and the second touch electrodes function to realize a touch function; liquid crystal molecules in regions under the plurality of second electrodes rotate, and liquid crystal molecules in regions under the plurality of second touch electrodes do not rotate, forming the liquid crystal grating.

2. The touch liquid crystal grating according to claim 1, wherein each of the second electrodes directly corresponds to each of the first electrodes and both have an equal width.

3. The touch liquid crystal grating according to claim 2, wherein each of the second electrodes comprises at least two strip-shaped sub-electrodes.

4. The touch liquid crystal grating according to claim 3, wherein the plurality of first touch electrodes are strip-shaped electrodes and perpendicular to the plurality of second touch electrodes in a different plane, and the second electrodes, the second touch electrodes and the first electrodes are parallel to each other.

5. The touch liquid crystal grating according to claim 1, wherein a width of each of the second electrodes is a half of a unit pixel width, and the width of each of the second electrodes equals to a width of the spacing region between two adjacent second electrodes.

6. The touch liquid crystal grating according to claim 1, wherein each of the second touch electrodes comprises at least two second touch sub-electrodes parallel to each other and either ends of all second touch sub-electrodes of each of the second touch electrode are connected by a metal wire.

7. The touch liquid crystal grating according to claim 1, further comprising:
   a planarization layer, covering the plurality of first touch electrodes; and
   a third polarizer, disposed on a side of the planarization layer opposite to the liquid crystal layer.

8. The touch liquid crystal grating according to claim 3, wherein the plurality of second electrodes are connected together and the strip-shaped sub-electrodes of each of the second electrodes are electrically connected together.

9. The touch liquid crystal grating according to claim 1, wherein a width of each of the first touch electrodes is 5 mm~6 mm.

10. The touch liquid crystal grating according to claim 1, wherein a width of each of the second electrodes is not equal to a width of the spacing region between any two adjacent second electrodes.

11. The touch liquid crystal grating according to claim 1, wherein the first electrode is grounded when the touch liquid crystal grating is powered on.

12. A touch 3D display device, comprises:
    a display panel; and
    a touch liquid crystal grating according to claim 1, disposed on a light exiting side of the display panel.

13. The touch 3D display device according to claim 12, wherein the display panel is a liquid crystal display panel including an array substrate and an opposite substrate cell-assembled to form a liquid crystal cell and liquid crystal material filled in the liquid crystal cell, and
    wherein the touch liquid crystal grating further comprises:
       a planarization layer, covering the plurality of first touch electrodes; and a third polarizer, disposed on a side of the planarization layer opposite to the liquid crystal layer, a direction of a transmission axis of a second polarizer disposed on a side of the opposite substrate opposite to the liquid crystal material is parallel to that of a transmission axis of the third polarizer of the touch liquid crystal grating.

14. The touch 3D display device according to claim 12, wherein the display panel is an organic electroluminescence display panel, a plasma display panel or an electronic paper,
    wherein the touch liquid crystal grating further comprises:
       a planarization layer, covering the plurality of first touch electrodes; and a third polarizer, disposed on a side of the planarization layer opposite to the liquid crystal layer, and the touch liquid crystal grating further comprises a first polarizer on a side of the second substrate opposite to the liquid crystal layer, a direction of a transmission axis of the first polarizer is parallel to that of a transmission axis of the third polarizer.

* * * * *